(12) United States Patent
Henze et al.

(10) Patent No.: US 8,507,633 B2
(45) Date of Patent: Aug. 13, 2013

(54) THERMOPLASTIC POLYURETHANES

(75) Inventors: Oliver Steffen Henze, Bremen (DE); Ruediger Krech, Diepholz (DE); Frank Prissok, Lemfoerde (DE); Karin Scheffer, Lemfoerde (DE); Frank Schaefer, Stemwede (DE); Heinrich Niermann, Brockum (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 440 days.

(21) Appl. No.: 12/293,103

(22) PCT Filed: Apr. 11, 2007

(86) PCT No.: PCT/EP2007/053509
§ 371 (c)(1),
(2), (4) Date: Sep. 16, 2008

(87) PCT Pub. No.: WO2007/118827
PCT Pub. Date: Oct. 25, 2007

(65) Prior Publication Data
US 2009/0069526 A1    Mar. 12, 2009

(30) Foreign Application Priority Data

Apr. 19, 2006  (EP) ..................... 06112735

(51) Int. Cl.
*C08G 18/00* (2006.01)
(52) U.S. Cl.
USPC .................. 528/85; 528/44; 528/48; 528/59; 528/65
(58) Field of Classification Search
USPC ..................... 528/44, 48, 59, 65, 85
See application file for complete search history.

(56) References Cited

U.S. PATENT DOCUMENTS

| 4,245,081 A * | 1/1981 | Quiring et al. .................. 528/65 |
| 5,545,706 A * | 8/1996 | Barksby et al. ................. 528/49 |
| 5,545,707 A * | 8/1996 | Heidingsfeld et al. .......... 528/60 |
| 6,593,444 B2 * | 7/2003 | Forschner et al. .............. 528/85 |
| 6,613,867 B2 * | 9/2003 | Sonnenschein et al. ........ 528/76 |
| 2003/0122282 A1 * | 7/2003 | Plummer et al. ......... 264/328.17 |

FOREIGN PATENT DOCUMENTS

| EP | 0 004 937 | 10/1979 |
| EP | 0 152 049 | 8/1985 |
| EP | 0 571 831 | 12/1993 |

OTHER PUBLICATIONS

"Recycling project for ski boots", European Plastics News, EMAP Business Publication, London, No. 2, p. 10, XP000373616, (1993).

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

A process for the preparation of thermoplastic polyurethane by reacting (a) isocyanates with (b) compounds reactive toward isocyanates and having a molecular weight ($M_w$) of from 500 to 10 000 g/mol and (c) chain extenders having a molecular weight of from 50 to 499 g/mol, if appropriate in the presence of (d) catalysts and/or (e) conventional additives, wherein the chain extender mixture consisting of a main chain extender (c1) and one or more co-chain extenders (c2) is used and the thermoplastic polyurethane prepared has a rigid phase fraction of greater than 0.40, the rigid phase fraction being defined by the following formula:

$$\text{rigid phase fraction} = \left\{ \sum_{x=1}^{k} [(m_{KVx}/M_{KVx}) * M_{Iso} + m_{KVx}] \right\} / m_{ges}$$

with the following meanings:
$M_{KVx}$: molar mass of the chain extender x in g/mol
$m_{KVx}$: mass of the chain extender x in g
$M_{Iso}$: molar mass of the isocyanate used in g/mol
$m_{ges}$: total mass of all starting materials in g
k: number of chain extenders.

10 Claims, No Drawings

THERMOPLASTIC POLYURETHANES

The invention relates to a process for the preparation of thermoplastic polyurethane by reacting (a) isocyanates with (b) compounds reactive toward isocyanates and having a molecular weight ($M_w$) of from 500 to 10 000 g/mol and (c) chain extenders having a molecular weight of from 50 to 499 g/mol, if appropriate in the presence of (d) catalysts and/or (e) conventional additives, wherein the chain extender mixture consisting of a main chain extender (c1) and one or more co-chain extenders (c2) is used and the thermoplastic polyurethane prepared has a rigid phase fraction of greater than 0.4, preferably greater than 0.5, the rigid phase fraction being defined by the following formula:

$$\text{Rigid phase fraction} = \left\{\sum_{x=1}^{k}[(m_{KVx}/M_{KVx})*M_{Iso} + m_{KVx}]\right\}/m_{ges}$$

with the following meanings:
$M_{KVx}$: molar mass of the chain extender x in g/mol
$m_{KVx}$: mass of the chain extender x in g
$M_{Iso}$: molar mass of the isocyanate used in g/mol
$m_{ges}$: total mass of all starting materials in g
k: number of chain extenders,
and thermoplastic polyurethanes obtainable in this manner. The invention furthermore relates to ski shoes, preferably ski boots, particularly preferably the outer shell of a ski boot, based on thermoplastic polyurethane obtainable by reacting (a) isocyanates with (b) compounds reactive toward isocyanates and having a molecular weight ($M_n$), of from 500 to 10 000 g/mol and (c) chain extenders, preferably diols, particularly preferably alkanediols, having a molecular weight of from 50 to 499 g/mol, if appropriate in the presence of (d) catalysts and/or (e) conventional additives, the chain extender (c) being a mixture comprising a main chain extender (c1) and one or more co-chain extenders (c2). The invention also relates to processes for the production of ski shoes, preferably ski boots, particularly preferably the outer shell of a ski boot, the thermoplastic polyurethane according to the invention being processed by means of injection molding to give the ski shoe, preferably ski boot, particularly preferably outer shell of a ski boot.

Thermoplastics are plastics which remain thermoplastic when they are repeatedly heated and cooled in the temperature range typical of the material for processing and use. Thermoplastic is understood as meaning the property of a plastic to repeatedly soften at elevated temperature in temperature range typical for it and to harden on cooling and, in the softened state, to be repeatedly moldable by flow as a shaped article, extrudate or worked part to give a semi-finished product or articles.

Thermoplastics are widespread in industry and are used in the form of fibers, sheets, films, moldings, bottles, sheaths, packaging, etc. Thermoplastic polyurethane (referred to below as TPU) is an elastomer which is used in many applications, for example tubes, shoe applications, films, fibers and ski boots. The production of ski shoes, for example ski boots, in particular the outer, hard shells of ski boots, by means of injection molding from thermoplastics is generally known.

The requirement profile for thermoplastic polyurethane which is suitable for the production of ski boots, in particular the outer shell thereof, is complex. Firstly, the low-temperature properties should be very good, i.e. the material should have sufficient flexibility and not break or splinter at the temperatures of use. Secondly, with regard to an attractive external design, high transparency of the material is increasingly being required in order to permit as broad a range of possible designs with regard to color.

It was therefore an object of the present invention to provide thermoplastic polyurethane for the production of ski boots which offers as large a latitude as possible in decoration and design for the ski boots. Moreover, the TPU should have good mechanical properties, in particular high notched impact strength at low temperatures and at the same time high transparency at large wall thicknesses.

These objects could be achieved by the thermoplastic polyurethanes described at the outset and the processes for their preparation and in particular the ski shoes according to the invention which are described at the outset.

By using a chain extender mixture, materials which are particularly suitable especially for ski boots are obtained. These materials have a relatively large processing window and are distinguished by high transparency in combination with good low-temperature properties. The TPU according to the invention preferably have a high moduli of elasticity and a large rigid phase fraction.

Ski shoes which contain TPU in which the proportion n1 of the main chain extender (c1), based on the total amount n of the chain extenders (c) used, is from 0.8 to 0.999, preferably from 0.90 to 0.999, are preferred. In general, known aliphatic, araliphatic, aromatic and/or cycloaliphatic compounds having a molecular weight $M_n$ of 50 to 499, preferably difunctional compounds, can be used as chain extenders (c), preferably akanediols having 2 to 10 carbon atoms in the alkylene radical, in particular 1,3-propanediol, 1,4-butanediol, 1,6-hexanediol and/or di-, tri-, tetra-, penta-, hexa-, hepta-, octa-, nona- and/or decaalkylene glycols having 3 to 8 carbon atoms, preferably corresponding oligo- and/or polypropylene glycols. A straight-chain or branched alkanediol having 2 to 6 carbon atoms is preferably used as main chain extender (c1) and one or more straight-chain or branched alkanediols having 2 to 12 carbon atoms are preferably used as co-chain extenders (c2), main chain extender (c1) and the co-chain extender or extenders (c2) differing in the number of carbon atoms and/or being structural isomers. Particularly preferably, the main chain extender (c1) is 1,4-butanediol and the isocyanate (a) is diphenylmethane 4,4'-diisocyanate (MDI). Particularly preferably, the co-chain extender (c2) is 1,3-propanediol and/or 1,6-hexanediol, particularly preferably 1,3-propanediol.

The thermoplastic polyurethane of the ski shoe, according to the invention, preferably has a rigid phase fraction of greater than 0.4, particularly preferably greater than 0.5, the rigid phase fraction being defined by the following formula:

$$\text{Rigid phase fraction} = \left\{\sum_{x=1}^{k}[(m_{KVx}/M_{KVx})*M_{Iso} + m_{KVx}]\right\}/m_{ges}$$

with the following meanings:
$M_{KVx}$: molar mass of the chain extender x in g/mol
$m_{KVx}$: mass of the chain extender x in g
$M_{Iso}$: molar mass of the isocyanate used in g/mol
$m_{ges}$: total mass of all starting materials in g
k: number of chain extenders.
Ski shoes comprising thermoplastic polyurethane which have a transparency value T of less than or equal to 3.2, determined according to DIN 55988 (index 1 without correction), at a layer thickness h of 8.2 mm are particularly preferred.

Furthermore, ski shoes comprising thermoplastic polyurethane and having a Charpy notched impact strength at −30° C. according to DIN EN ISO 179-1/1eA of greater than 10 KJ/m$^2$, preferably of greater than 15 kJ/m$^2$, are particularly preferred.

Processes for the preparation of thermoplastic polyurethanes, also referred to as TPU in this document, are generally known. In general, TPUs are prepared by reacting (a) isocyanates with (b) compounds reactive toward isocyanates, usually having a molecular weight ($M_n$) of from 500 to 10 000, preferably from 500 to 5000, particularly preferably from 800 to 3000, and (c) chain extenders having a molecular weight ($M_n$) of from 50 to 499, if appropriate in the presence of (d) catalysts and/or (e) conventional additives.

Below, the starting components and processes for the preparation of preferred polyurethanes are to be described by way of example. The components (a), (b), (c) and, if appropriate (d) and/or (e) usually used in the preparation of the polyurethanes are to be described below by way of example:

a) organic isocyanates (a) which may be used are generally known aliphatic, cycloaliphatic, araliphatic and/or aromatic isocyanates, for example tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), toluylene 2,4- and/or 2,6-diisocyanate (TDI), diphenylmethane diisocyanate, dimethyldiphenyl 3,3'-diisocyanate, diphenylethane 1,2-diisocyanate and/or phenylene diisocyanate. 4,4'-MDI is preferably used.

b) The generally known compounds reactive toward isocyanates can be used as compounds (b) reactive toward isocyanates, for example polyesterols, polyetherols and/or polycarbonate diols, which are usually also summarized by the term "polyols", having molecular weights ($M_n$) of from 500 to 8000, preferably from 600 to 6000, in particular from 800 to less than 3000, and preferably an average functionality with respect to isocyanates of from 1.8 to 2.3, preferably from 1.9 to 2.2, in particular 2. Polyetherpolyols are preferably used, for example those based on generally known initiator substances and conventional alkylene oxides, for example ethylene oxide, propylene oxide and/or butylene oxide, preferably polyetherols based on 1,2-propylene oxide and ethylene oxide and in particular polyoxytetramethylene glycols. The polyetherols have the advantage that they have a higher stability to hydrolysis than polyesterols. Furthermore, so-called polyetherols having a low degree of unsaturation can be used as polyetherols. In the context of this invention, polyols having a low degree of unsaturation are understood in particular as meaning polyether alcohols having a content of less than 0.02 meq/g, preferably less than 0.01 meq/g, of unsaturated compounds. Such polyether alcohols are generally prepared by an addition reaction of alkylene oxides, in particular ethylene oxide, propylene oxide and mixtures thereof, where the diols or triols described above, in the presence of highly active catalysts. Such highly active catalysts are, for example, cesium hydroxide and multimetal cyanide catalysts, also referred to as DMC catalysts. A frequently used DMC catalyst is zinc hexacyanocobaltate. The DMC catalyst can be left in the polyether alcohol after the reaction but is usually removed, for example by sedimentation or filtration. Instead of a polyol, it is also possible to use mixtures of different polyols. Particularly preferably, the thermoplastic polyurethane according to the invention is based on polytetramethylene glycol having a molecular weight ($M_n$) of from 600 to 2000 g/mol, preferably from 800 to 1400 g/mol, particularly preferably from 950 to 1050 g/mol, as (b) compounds reactive toward isocyanates and having a molecular weight ($M_n$) of from 500 to 10 000 g/mol.

Particularly preferably, the components a) to c) are difunctional compounds, i.e. diisocyanates (a), difunctional polyols, preferably polyetherols (b), and difunctional chain extenders, preferably diols.

d) suitable catalysts which in particular accelerate the reaction between the NCO groups of the diisocyanates (a) and the hydroxyl groups of the components (b) and (c) are the conventional tertiary amines known according to the prior art, such as, for example, triethylamine, dimethylcyclohexylamine, N-methylmorpholine, N,N'-dimethylpiperazine, 2-(dimethylaminoethoxy)ethanol, diazabicyclo[2.2.2]octane and the like, and in particular organic metal compounds, such as titanic esters, iron compounds, such as, for example, iron(III) acetylacetonate, tin compounds, e.g. tin diacetate, tin dioctanoate, tin dilaurate or the dialkyltin salts of aliphatic carboxylic acids, such as dibutyltin diacetate, dibutyltin dilaurate or the like. The catalysts are usually used in amounts of from 0.0001 to 0.1 part by weight per 100 parts by weight of polyhydroxy compound (b).

e) in addition to catalysts (d), conventional assistants and/or additives (e) can also be added to the components (a) to (c). For example surface-active substances, nucleating agents, lubricants and demolding agents, dyes and pigments, antioxidants, for example against hydrolysis, light, heat or discoloration, inorganic and/or organic fillers, flameproofing agents, reinforcing agents and plasticizers, metal deactivators may be mentioned. In preferred embodiment, the component (e) includes hydrolysis stabilizers, such as, for example, polymeric and low molecular weight carbodiimides. The thermoplastic polyurethane preferably comprises triazole and/or triazole derivatives and antioxidants in an amount of from 0.1 to 5% by weight, based on the total weight of the thermoplastic polyurethane. Suitable antioxidants are in general substances which inhibit or prevent undesired oxidative processes in the plastic to be protected. In general, antioxidants are commercially available. Examples of antioxidants are sterically hindered phenols, aromatic amines, thiosynergistic agents, organophosphorus compounds of trivalent phosphoros and hindered amine light stabilizers. Examples of sterically hindered phenol are to be found in Plastics Additive Handbook, 5$^{th}$ edition, H. Zweifel, ed, Hanser Publishers, Munich, 2001 ([1]), pages 98-107 and pages 116-121. Examples of aromatic amines are to be found in [1] pages 107-108. Examples of thio synergistic agents are given in [1] pages 104-105 and 112-113. Examples of phosphites are to be found in [1] pages 109-112. Examples of hindered amine light stabilizers are given in [1] pages 123-136. In preferred embodiment, the antioxidants, in particular the phenolic antioxidants, have a molar mass of greater than 350 g/mol, particularly preferably of greater than 700 g/mol, and a maximum molar mass of <10 000 g/mol, preferably <3000 g/mol. Furthermore, they preferably have a melting point of less than 180° C. Furthermore, antioxidants which are amorphous or liquid are preferably used. It is also possible to use mixtures of two or more antioxidants as component (i).

In addition to said components a), b) and c) and, if appropriate d) and e), it is also possible to use chain regulators, usually having a molecular weight of from 31 to 3000. Such chain regulators are compounds which have only one functional group reactive toward isocyanates, such as, for example, monofunctional alcohols, monofunctional amines and/or monofunctional polyols. By means of such chain regulators, flow behavior, in particular in the case of TPUs, can be established in a targeted manner. Chain regulators can generally be used in an amount of from 0 to 5, preferably from 0.1 to 1, parts by weight, based on 100 parts by weight of component b) and by definition are included in the component (c).

All molecular weights mentioned in this document have the unit [g/mol].

The components (b) and (c) can be varied in relatively broad molar ratios for establishing the hardness of the TPUs. Molar ratios of component (b) to chain extenders (c) used in total of from 10:1 to 1:10, in particular from 1:1 to 1:4, have proven useful, the hardness of the TPU increasing with increasing content of (c).

The reaction can be effected at conventional indices, preferably at an index of from 950 to 1050, particularly preferably at an index of from 970 to 1010, in particular from 980 to 995. The index is defined by the ratio of the isocyanate groups of component (a) which are used altogether in the reaction to the groups reactive toward isocyanates, i.e. the active hydrogens, of components (b) and (c). At an index of 1000, there is one active hydrogen atom, i.e. one function reactive toward isocyanates of components (b) and (c) per isocyanate group of component (a). At indices above 1000, more isocyanate groups than OH groups are present. The preparation of the TPU can be effected by the known processes, continuously, for example using reaction extruders or the belt process according to the one-shot or the prepolymers process, or batchwise according to the known prepolymers process. In these processes, the components (a), (b) and, if appropriate (c), (d) and/or (e) which are reacted are mixed with one another in succession or simultaneously, the reaction beginning immediately. In the extruder process, the components (a), (b) and, if appropriate (c), (d) and/or (e) are introduced individually or as a mixture into the extruder and reacted, for example, at temperatures of from 100 to 280° C., preferably from 140 to 250° C., and the TPU obtained is extruded, cooled and granulated.

The thermoplastically processable polyurethane elastomers according to the invention are used for the production of ski shoes, preferably ski boots, in particular outer shells of ski boots, ski boot heels, collars for the ski boot shaft and decorative elements. The production of these products by means of conventional injection molding processes is generally known.

EXAMPLES

Example 1 (Comparative Example)

A commercially available TPU (Elastollan® 1164D 15, Elastogran GmbH) prepared from MDI, 1,4-butanediol and polytetramethylene glycol (OHN of 113.3 mg KOH/g), having a rigid phase fraction of 0.53, was processed to give injection molded sheets (dimension of the injection molded sheets 200×150×8.2 mm, for conditions, see tables 1 and 2). The surface of the injection molded sheets was smoothed by immersion in THF for one minute and transparency value T of 7.0 was then determined according to DIN 55988 (index 1 without correction, apparatus Hunterlab UltraScan) at a layer thickness h of 8.2 mm. The Charpy notched impact strength at −30° C. according to DIN EN ISO 179-1/1eA of the material was determined as 7 kJ/m$^2$.

Example 2 (Comparative Example)

A TPU was prepared from MDI, 1,4-butanediol and polytetramethylene glycol (OHN of 113.3 mg KOH/g), having a rigid phase fraction of 0.53, using a twin-screw extruder of type ZSK 58 from Werner and Pfleiderer, Stuttgart, with a process section length of 48 D, divided into 12 barrels. The granulation was effected by means of a conventional underwater granulation apparatus from Gala (UWG). The material was then processed to give injection molded sheets (dimension of the injection molded sheets 200×150×8.2 mm, for conditions, see tables 1 and 2). The surface of the injection molded sheets was smoothed by immersion in THF for one minute and a transparency value T of 3.7 was then determined according to DIN 55988 (index 1 without correction, apparatus: Hunterlab UltraScan) at a layer thickness h of 8.2 mm. The Charpy notched impact strength at −30° C. according to DIN EN ISO 179-1/1eA of the material was determined as 9 kJ/m$^2$.

Example 3

A material based on MDI, 1,4-butanediol, 1,3-propanediol and polytetramethylene glycol (OHN of 113.3 mg KOH/g), having a rigid phase fraction of 0.51, was prepared using a twin-screw extruder of type ZSK 92 from Werner and Pfleiderer, Stuttgart, with a process section length of 48 D divided into 12 barrels. 1,3-propanediol and 1,4-butanediol were used in a ratio of 1:30.7. The granulation was effected by means of a conventional granulation apparatus from Gala (UWG). The material was then processed to give injection molded sheets (dimension of the injection molded sheets 200×150×8.2 mm, for conditions, see tables 1 and 2). The surface of the injection molded sheets was smoothed by immersion in THF for one minute and a transparency value T of 3.0 was then determined according to DIN 55988 (index 1 without correction, apparatus: Hunterlab UltraScan) at a layer thickness h of 8.2 mm. The Charpy notched impact strength at −30° C. according to DIN EN ISO 179-1/1eA of the material was determined as 25 kJ/m$^2$.

Example 4

A TPU based on MDI, 1,4-butanediol, 1,3-propanediol and polytetramethylene glycol (OHN of 113.3 mg KOH/g), having a rigid phase fraction of 0.56, was prepared analogously to example 3. 1,3-propanediol and 1,4-butanediol were used in a ratio of 1:24.2. The material was then processed to give injection molded sheets (dimension of the injection molded sheets 200×150×8.2 mm, for conditions, see tables 1 and 2). The surface of the injection molded sheets was smoothed by immersion in THF for one minute and transparency value T of 2.5 was then determined according to DIN 55988 (index 1 without correction, apparatus: Hunterlab UltraScan) at a layer thickness h of 8.2 mm. The Charpy notched impact strength at −30° C. according to DIN EN ISO 179-1/1eA of the material was determined as 13.5 kJ/m².

TABLE 1

Conditions for the production of the injection molded sheets for examples 1-5 on a DEMAG ergotech 200.

| | Dosage | | Injecting | | | Times | | | After | | Pressures | | | |
| | | | | | | | | | | Injection | After | Dynamic | Hydro- |
| Ex. | Metenng stroke mm | Speed rpm | Injection speed mm/s | reverse point mm | cushion mm | cycle time s | cooling time s | plasticizing time s | injecion time s | pressure time s | pressure System bar | pressure System bar | pressure System bar | motor System bar |
|---|---|---|---|---|---|---|---|---|---|---|---|---|---|---|
| 1 | 153 | 55 | 45.0 | 11.00 | 7.5 | 159.0 | 80 | 37 | 3.4 | 50 | 81 | 48 | 20 | 120 |
| 2 | 153 | 55 | 80.0 | 11.00 | 8 | 151 | 80 | 32 | 1.9 | 50 | 134 | 55 | 20 | 130 |
| 3 | 153 | 55 | 45.0 | 11.00 | 8 | 187 | 80 | 35 | 3.4 | 50 | 99 | 48 | 20 | 123 |
| 4 | 150 | 55 | 45.0 | 11.00 | 7.00 | 153 | 80 | 28 | 3.3 | 50 | 102 | 44 | 20 | 120 |
| 5 | 150 | 55 | 45.0 | 11.00 | 7.0 | 155.0 | 80 | 28 | 3.3 | 50 | 104 | 45 | 20 | 125 |

TABLE 2

Conditions for the production of injection molded sheets for examples 1-5 on a DEMAG ergotech 200.

| | Temperatures | | | | | | | | | |
| | Mold | | | Injection apparatus | | | | | Hot runner | |
| Exp | Injection side ° C. | Clamping side ° C. | Ef-Zone ° C. | Zone 1 ° C. | Zone 2 ° C. | Zone 3 ° C. | Zone 4 ° C. | Nozzle ° C. | 1 ° C. | 2 ° C. |
|---|---|---|---|---|---|---|---|---|---|---|
| 1 | 20 | 45 | 40 | 210 | 220 | 230 | 235 | 235 | 235 | 230 |
| 2 | 20 | 45 | 40 | 205 | 210 | 210 | 215 | 215 | 215 | 210 |
| 3 | 20 | 45 | 40 | 210 | 220 | 230 | 235 | 235 | 235 | 230 |
| 4 | 20 | 45 | 40 | 210 | 220 | 225 | 225 | 225 | 225 | 220 |
| 5 | 20 | 45 | 40 | 210 | 220 | 225 | 225 | 220 | 220 | 215 |

We claim:

1. A process for the preparation of thermoplastic polyurethane by reacting (a) the isocyanate diphenylmethane 4,4'-diisocyanate with (b) compounds reactive toward isocyanates and having a molecular weight ($M_w$) of from 500 to 10 000 g/mol and (c) chain extenders having a molecular weight of from 50 to 499 g/mol, optionally in the presence of (d) catalysts and/or (e) conventional additives, wherein the chain extender is a mixture consisting of a main chain extender 1,4-butanediol (c1) and a co-chain extender 1,3-propanediol (c2) and the thermoplastic polyurethane prepared has a rigid phase fraction of greater than 0.40, said rigid phase fraction being defined by the following formula:

$$\text{Rigid phase fraction} = \left\{ \sum_{x=1}^{k} [(m_{KVx}/M_{KVx}) * M_{Iso} + m_{KVx}] \right\} / m_{ges}$$

wherein:
$M_{KVx}$: molar mass of the chain extender x in g/mol
$m_{KVx}$: mass of the chain extender x in g
$M_{Iso}$: molar mass of the isocyanate used in g/mol
$m_{ges}$: total mass of all starting materials in g
k: number of chain extenders wherein the proportion of n1 of the main chain extender (c1), based on the total amount of n of the chain extender (c) used, is from 0.80 to 0.999.

2. A thermoplastic polyurethane prepared by a process according to claim 1.

3. A ski shoe based on thermoplastic polyurethane prepared by reacting (a) diphenylmethane 4,4'-diisocyanate with (b) compounds reactive toward isocyanates and having a molecular weight ($M_w$) of from 500 to 10 000 g/mol and (c) chain extenders having a molecular weight of from 50 to 499 g/mol, optionally in the presence of (d) catalysts and/or (e) conventional additives, wherein the chain extender (c) is a mixture consisting of a main chain extender 1,4-butanediol (c1) and a co-chain extender 1,3-propanediol (c2) wherein the proportion of n1 of the main chain extender (c1), based on the total amount of n of the chain extender (c) used, is from 0.80 to 0.999.

4. The ski shoe according to claim 3, wherein the thermoplastic polyurethane is based on polytetramethylene glycol having a molecular weight ($M_n$) of from 600 to 2000 g/mol as (b) compounds reactive toward isocyanates and having a molecular weight ($M_n$) of from 500 to 10 000 g/mol.

5. The ski shoe according to claim 3, wherein the thermoplastic polyurethane has a rigid phase fraction of greater than 0.4, said rigid phase fraction being defined by the following formula:

$$\text{Rigid phase fraction} = \left\{ \sum_{x=1}^{k} [(m_{KVx}/M_{KVx}) * M_{Iso} + m_{KVx}] \right\} / m_{ges}$$

wherein:
$M_{KVx}$: molar mass of the chain extender x in g/mol
$m_{KVx}$: mass of the chain extender x in g
$M_{Iso}$: molar mass of the isocyanate used in g/mol $m_{ges}$: total mass of all starting materials in g k: number of chain extenders.

6. The ski shoe according to claim 3, wherein the thermoplastic polyurethane has a transparency value T of less than or equal to 3.2, determined according to DIN 55988 (index 1 without correction), at a layer thickness H of 8.2 mm.

7. The ski shoe according to claim 3, wherein the thermoplastic polyurethane has a Charpy notched impact strength of −30° C. according to DIN EN ISO 179-1/1eA of greater than 10 kJ/m².

8. A process for the production of a ski shoe, wherein a thermoplastic polyurethane according to claim 2 is processed by means of injection molding to give the ski shoe.

9. The process for the production of thermoplastic polyurethane according to claim 1 wherein components (b) and (c) are used in a molar ratio of 10:1 to 1:10.

10. The process for the production of thermoplastic polyurethane according to claim 1 wherein components (b) and (c) are used in a molar ratio of 1:1 to 1:4.

* * * * *